United States Patent
Nielsen

[11] Patent Number: 5,873,233
[45] Date of Patent: *Feb. 23, 1999

[54] METHOD OF OPERATING A GAS-TURBINE GROUP

[75] Inventor: Henrik Nielsen, Wettingen, Switzerland

[73] Assignee: Asea Brown Boveri AG, Baden, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 708,746

[22] Filed: Sep. 5, 1996

[30] Foreign Application Priority Data

Oct. 26, 1995 [DE] Germany .......................... 195 39 773.8

[51] Int. Cl.⁶ .......................................................... F02C 3/28
[52] U.S. Cl. .......................................... 60/39.02; 60/39.12
[58] Field of Search ................................ 60/39.02, 39.12, 60/39.182

[56] References Cited

U.S. PATENT DOCUMENTS 5,392,595  2/1995  Glickstein et al. ..................... 60/39.12

*Primary Examiner*—Louis J. Casaregola
*Attorney, Agent, or Firm*—Burns, Doane, Swecker & Mathis, L.L.P.

[57] ABSTRACT

In a method of operating a gas-turbine group and of cooling the units subjected to high thermal loading, a portion of compressor air (18) is diverted upstream of a first combustion chamber (2) and fed through a generator (14) working toward conversion and as a heat exchanger. A natural-gas/water or natural-gas/steam mixture (15) flows in counterflow through the same generator (14). With the cooling of the compressor air (18) inside the generator (14), the energy required for an endothermic reaction of the mixture (15) is released.

5 Claims, 1 Drawing Sheet

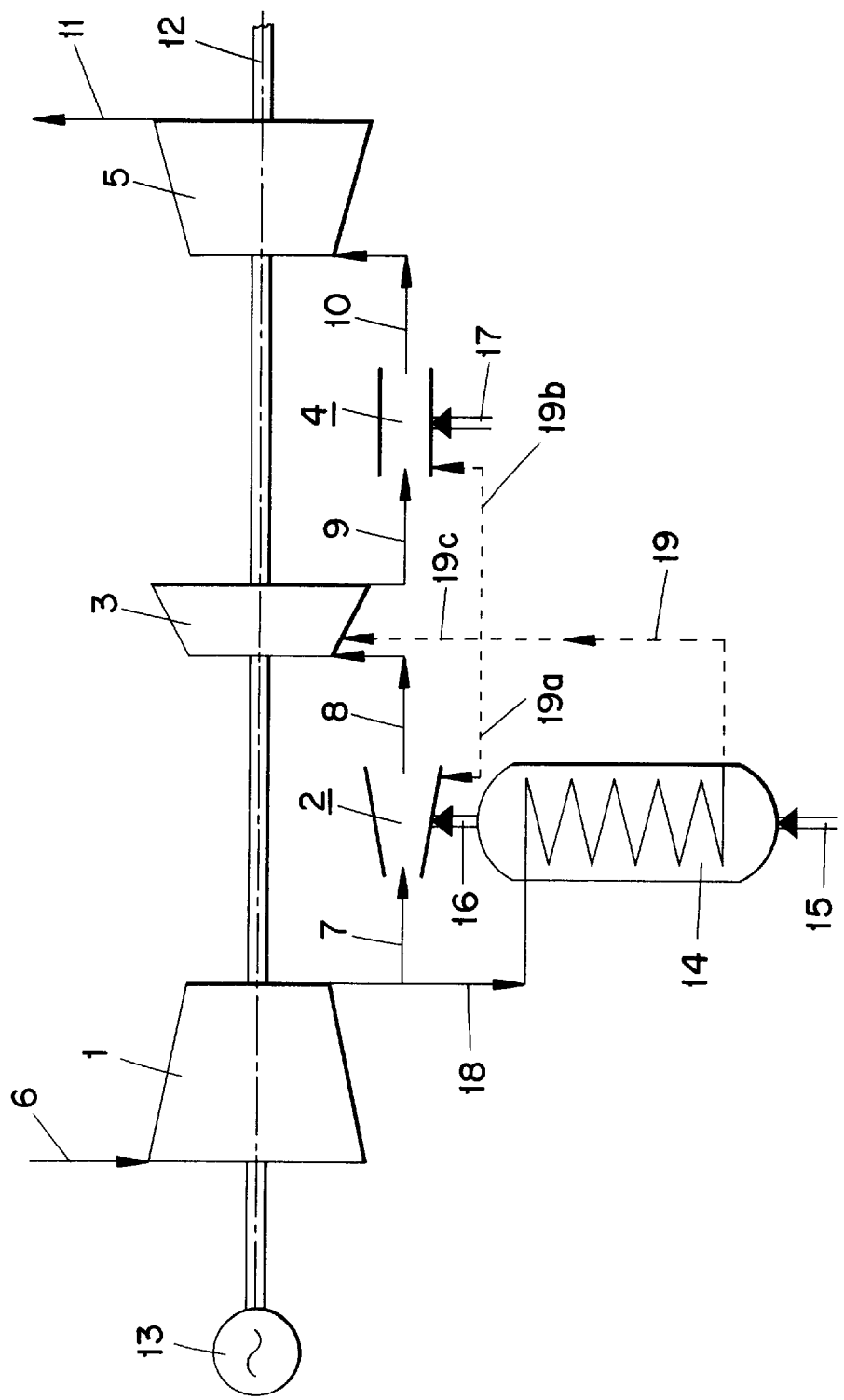

METHOD OF OPERATING A GAS-TURBINE GROUP

BACKGROUND OF THE INVENTION

The present invention relates to a method of operating a gas-turbine group with cooling by air extracted from the process.

In gas-turbine groups of the more recent generation, the cooling of the units subjected to high thermal loading plays a central role. In principle, the aim is to extract air from the process at a suitable point, to feed this air to the units to be cooled and to then feed it back again at a suitable point into the cycle of the gas-turbine group. In this type of cooling, the effective mass flow of the plant is always diminished, which invariably leads to an efficiency loss of the same. This is in principle connected with the fact that, in these gas-turbine groups, there is as a rule no excess air which could be diverted without loss of output and efficiency. The initial situation with regard to cooling the units subjected to high thermal loading is accentuated if the gas-turbine group is in combination with a steam cycle, that is if it is operated as a combined-cycle plant, since the exhaust gases from the last turbine of the gas-turbine group, which furnish the actual thermal potential for the formation of steam, must have temperatures of over 600° C. in order to obtain as much steam of superior quality as possible. It is obvious that this exhaust-gas temperature induces upstream the temperature of the hot gases from the combustion chambers, whereby the same accordingly have to be designed for intensive cooling. As far as is apparent, compromises invariably have to be made for such cooling, which compromises affect either the cooling capacity or the efficiency of the plant.

SUMMARY OF THE INVENTION

Accordingly, one object of the invention is to obtain, in a method of the type mentioned at the beginning, with a minimized air portion from the process a maximized cooling effect of the units of the gas-turbine group which are subjected to high thermal loading.

The object is achieved with the aid of a circuit which is connected with the conversion of a natural gas. This conversion is based on a thermochemical recuperation and its aim is to provide a fuel of higher calorific value compared with that of the natural gas upon the addition of energy. From the composition of the mixture brought to conversion, the reaction: $CH_4 + H_2O + Q \rightarrow CO + 3H_2$ takes place endothermically, where Q denotes the energy to be supplied. The invention utilizes this endothermic reaction by this energy being extracted from the compressor air, i.e. a portion of compressor air is diverted for the conversion and passed into a catalytic reactor through which the natural-gas/water or natural-gas/steam mixture flows. Here, this reactor basically works as a heat exchanger in such a way that the extracted compressor air undergoes substantial cooling herein so that it can subsequently be used as high-quality cooling air at a suitable point for the units of the plant which are to be cooled.

The essential advantages of the invention may be seen in the fact that no energy has to be diverted or supplied for the endothermic process, which energy, in the balance sheet, would always lead to an efficiency loss of the plant. At the same time, additional energy also does not have to be expended for the thermal treatment of the compressor air to form cooling air. Finally, this cooling air is of such high quality that smaller portions are even sufficient for the desired cooling of the units of the gas-turbine group which are subjected to high thermal loading.

Advantageous and expedient further developments of the achievement of the object according to the invention are defined in the further claims.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein the single FIGURE shows a gas-turbine group having a thermochemical process for preparing a fuel of high-energy value and high-quality cooling air.

DESCRIPTION OF THE PREFERRED EMBODIMENT

Referring now to the drawing, wherein all elements not required for directly understanding the invention have been omitted and the direction of flow of the media is indicated by arrows, the present gas-turbine group is based on staged combustion. This gas-turbine group, considered as an autonomous unit, consists of a compressor 1, a first combustion chamber 2 arranged downstream of the compressor, a first turbine 3 arranged downstream of this combustion chamber 2, a second combustion chamber 4 arranged downstream of this turbine 3, and a second turbine 5 arranged downstream of this combustion chamber 4. The said turbomachines 1, 3, 5 have a common rotor shaft 12. This rotor shaft 12 itself is preferably mounted on two bearings (not apparent in the FIGURE) which are placed on the head side of the compressor 1 and downstream of the second turbine 5. Depending on design, the compressor 1 may be subdivided into two sectional compressors (not shown), for example in order to increase the specific output. In such a configuration, an intercooler is then connected downstream of the first compressor and upstream of the second compressor, in which intercooler the partly compressed air is intercooled. The heat accumulating in this intercooler (likewise not shown) is used in an optimum, that is profitable, manner; for example it is fed back into the process. The intake air 6 flows as compressed air 7 into a casing (not shown in more detail) which includes the compressor outlet and the first turbine 3. The first combustion chamber 2, which is preferably designed as a continuous annular combustion chamber, is also accommodated in this casing. The compressed air 7 to the first combustion chamber 2 may of course be provided from an air-accumulator system (not shown). On the head side, the annular combustion chamber 2 has a number of burners (not shown in more detail) distributed over the periphery, which are preferably designed as premix burners. In principle, diffusion burners may also be used here. However, to reduce the pollutant emissions from this combustion, in particular as far as the NOx emissions are concerned, it is advantageous to provide an arrangement of premix burners, as described in U.S. Pat. No. 4,932,861 to Keller et al. the subject matter of the invention from the said publication being an integral part of this description; in addition, the type of fuel feed described there is also an integral part of this description. As far as the arrangement of the premix burners in the peripheral direction of the annular combustion chamber 2 is concerned, such an arrangement may differ from the conventional configuration of identical burners if required; premix burners of different sizes may be used instead. This is preferably done in such a way that a small premix burner of the same configuration is arranged in each case between two large premix burners. The size of the large premix burners, which fulfill the function of main burners, in relation to the small premix burners, which are the pilot burners of this combustion chamber, is established from case to case with regard to the burner air passing through them, that is the compressed air from the compressor 1. The pilot burners work as automatic premix burners over the entire load range of the combustion chamber, the air coefficient remaining virtually constant. The main burners are switched on or off according to certain provisions specific to the plant. Since the pilot burners can be run on an ideal mixture over the entire load range, the NOx emissions are very low even at part load. In such a configuration, the encircling flow lines in the front region of the annular combustion chamber 2 come very close up to the vortex centers of the pilot burners, so that an ignition per se is only possible with these pilot burners. During run-up, the fuel quantity which is fed via the pilot burners is increased until the latter are modulated, i.e. until the full fuel quantity is available. The configuration is selected in such a way that this point corresponds to the respective load disconnection conditions of the gas-turbine group. The further power increase is then effected via the main burners. At the peak load of the gas-turbine group, the main burners are therefore also fully modulated.

Since the configuration of "small" hot vortex centers, which is initiated by the pilot burners, between the "large" cooler vortex centers originating from the main burners turns out to be extremely unstable, very good burn-out with low CO and UHC emissions in addition to the NOx emissions is achieved even in the case of main burners operated on a lean mixture in the part-load range, i.e. the hot vortices of the pilot burners penetrate immediately into the small vortices of the main burners. The annular combustion chamber 2 may of course consist of a number of individual tubular combustion spaces which are likewise arranged in an inclined annular shape, sometimes also helically, around the rotor axis. This annular combustion chamber 2, irrespective of its design, is arranged geometrically in such a way that its length has no effect on the overall rotor length of the gas-turbine group. The hot gases 8 from this annular combustion chamber 2 are admitted to the first turbine 3 arranged directly downstream, the thermally expanding action of which on the hot gases is deliberately kept to a minimum, i.e. this turbine 3 will accordingly consist of no more than two rows of moving blades. In such a turbine 3 it will be necessary to provide pressure compensation at the end faces for the purpose of stabilizing the axial thrust. The hot gases 9 partly expanded in the turbine 3 and flowing directly into the second combustion chamber 4 are at quite a high temperature for the reasons explained; for specific operational reasons the design is preferably to allow for a temperature which is certainly still around 1000° C. This second combustion chamber 4 essentially has the form of a continuous annular, axial or quasi-axial cylinder; it may of course also consist of a number of axially, quasi-axially or helically arranged and self-contained combustion spaces. As far as the configuration of the annular combustion chamber 4 consisting of a single combustion space is concerned, a plurality of fuel lances 17 are disposed in the peripheral direction and radial direction of this annular cylinder. The combustion chamber 4 has no burner per se: the combustion of the fuel injected into the partly expanded hot gases 9 coming from the turbine 3 takes place here by self-ignition, if indeed the aforesaid temperature level permits such a mode of operation. Starting from the assumption that the combustion chamber 4 is operated with a gaseous fuel, that is, for example, natural gas, the temperature of the partly expanded hot gases 9 from the turbine 3 must be around 1000° C. for self-ignition, and this of course must also be the case during part-load operation, a factor which plays a causal role in the design of this turbine 2. In order to ensure the operational reliability and a high efficiency in the case of a combustion chamber designed for self-ignition, it is of the utmost importance that the flame front remains locally stable. For this purpose, a number of elements (not shown in more detail) are provided in this combustion chamber 4, preferably so as to be disposed on the inner and outer wall in the peripheral direction, which elements are placed in the axial direction preferably upstream of the fuel lances. The task of these elements is to generate vortices which induce a backflow zone, analogous to that in the premix burners (already mentioned) according to U.S. Pat. No. 4,932,861. Since this combustion chamber 4, on account of the axial arrangement and the overall length, is a high-velocity combustion chamber in which the average velocity of the working gases is greater than about 60 m/s, the vortex-generating elements must be designed to conform to the flow. On the inflow side, these elements are to preferably consist of a tetrahedral shape having inclined surfaces with respect to the inflow. The vortex-generating elements may be placed on the outer surface and/or on the inner surface. The vortex-generating elements may of course also be displaced axially relative to one another. The outflow-side surface of these vortex-generating elements runs essentially radially, i.e. perpendicularly to the wall of the combustion chamber, so that a backflow zone appears starting from this point. However, the self-ignition in the combustion chamber 4 must also continue to be assured in the transient load ranges as well as in the part-load range of the gas-turbine group, i.e. auxiliary measures must be provided which ensure the self-ignition in the combustion chamber 4 even if the temperature of the partly expanded hot gases 9 from the turbine 3 should be reduced for any reason in the region of the injection of the fuel. In order to ensure, even in such cases, reliable self-ignition of the gaseous fuel injected into the combustion chamber 4, a small quantity of another fuel having a lower ignition temperature is added to this fuel. The hot gases 10 prepared in the combustion chamber 4 are then admitted to a second turbine 5 arranged downstream. The thermodynamic characteristics of the gas-turbine group may be designed in such a way that the exhaust gases 11 from the second turbine 5 still have so much thermal potential to thus operate a steam cycle (not shown here) arranged downstream. The second combustion chamber 4 is preferably arranged between the outflow plane of the first turbine 3 and the inflow plane of the second turbine 5. Furthermore, since the expansion of the hot gases in the first turbine 3, for the reasons explained, takes place over few rows of moving blades, a gas-turbine group can be provided whose rotor shaft 12 can be mounted on two bearings in a technically satisfactory manner on account of its minimized length. The turbomachines deliver power via a coupled generator 15, which may also serve as a pony motor. After expansion in the turbine 5, the exhaust gases 11 still provided with a high thermal potential flow through a waste-heat steam generator 20 in which steam is generated by the heat-exchange process, which steam is then preferably used as working medium for a steam turbine 22. A portion of compressor air 18 is diverted before the inflow to the first combustion chamber 2 and is passed through a catalytic reactor 14 for reforming or conversion of the natural gas mixture. In counterflow principle, a mixture 15 consisting of natural gas and water or steam flows through this reactor 14. Regarding conversion, the generator is provided with a catalytic coating which is able to initiate the desired process at low temperatures. At a temperature level between 800°–850° C., 100% natural-gas conversion can be achieved with a nickel-coated catalyst. At a lower temperature, only a partial conversion can accordingly be achieved, which, however, is still sufficient in most cases. The partial quantity 18 of compressor air is cooled down to approximately 400° C. by the endothermic process taking place in the catalytic reactor 14, the energy extracted here enabling the mixture 15 to be converted to a higher calorific value. The cooling air 19 flowing out of the catalytic reactor 14 is then used to cool at least one unit, subjected to high thermal loading, of the gas-turbine group. In the FIGURE, the cooling air 19 is split up, for example, into three strands 19a, 19b, 19c which cool the first combustion chamber 2, the first turbine 3 and the second combustion chamber 4. Here, the cooling of the units takes place in parallel. Of course, this cooling may also be carried out in series. The provision, described here, of the cooling air 19 permits efficient cooling of the units to be cooled, whereby a sharp increase in the efficiency can be achieved. The conversion of the fuel can also be provided in this way for the second combustion chamber 4, either with the aid of a separate catalytic reactor or a catalytic reactor common to both combustion chambers.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of operating a gas-turbine group and of cooling units subjected to high thermal loading, the gas-turbine group comprising at least one compressor, at least one combustion chamber, at least one turbine and at least one electric machine, the method comprising the steps of:

extracting a portion of compressed air from the compressor;

feeding an entire remaining portion of compressed air from the compressor to the combustion chamber;

feeding the extracted compressed air to at least one reactor for reforming of one of a natural gas/water and natural gas/steam mixture flowing through the reactor;

wherein, heat in the extracted, compressed air is transferred to the mixture for an endothermic reforming reaction of the mixture and the extracted compressed air is cooled inside the reactor; and, directing the cooled, extracted compressed air to at least one thermally-loaded unit of the gas-turbine group for cooling.

2. The method as claimed in claim 1, wherein cooling of the extracted compressed air inside the reactor occurs with at least a partial endothermic reaction of the mixture.

3. The method as claimed in claim 1, wherein conversion of the mixture in the reactor is carried out in interaction with a catalytic coating present in the reactor.

4. The method as claimed in claim 1, wherein the gas-turbine group further comprises a second turbine and a second combustion chamber, and wherein the second combustion chamber is operated to provide hot gases for the second turbine.

5. The method as claimed in claim 1, wherein the gas-turbine group is connected to provide exhaust gas to a waste-heat steam generator and a steam turbine, and wherein the method further comprises directing exhaust gas to the waste-heat steam generator to produce steam, and feeding the steam to the steam turbine.

* * * * *